(12) United States Patent
Smith et al.

(10) Patent No.: US 8,892,858 B2
(45) Date of Patent: Nov. 18, 2014

(54) METHODS AND APPARATUS FOR TRUSTED BOOT OPTIMIZATION

(75) Inventors: Ned M. Smith, Hillsboro, OR (US); Vincent J. Zimmer, Federal Way, WA (US); Victoria C. Moore, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/810,654

(22) PCT Filed: Dec. 29, 2011

(86) PCT No.: PCT/US2011/067873
§ 371 (c)(1),
(2), (4) Date: Jan. 16, 2013

(87) PCT Pub. No.: WO2013/101081
PCT Pub. Date: Jul. 4, 2013

(65) Prior Publication Data
US 2014/0025939 A1 Jan. 23, 2014

(51) Int. Cl.
G06F 21/57 (2013.01)
G06F 9/24 (2006.01)
(52) U.S. Cl.
CPC ............... *G06F 21/575* (2013.01); *G06F 9/24* (2013.01)
USPC .................................. 713/1; 713/2; 713/100
(58) Field of Classification Search
USPC .................................. 713/1, 2, 100
See application file for complete search history.

(56) References Cited

U.S. PATENT DOCUMENTS

| 6,560,706 B1* | 5/2003 | Carbajal et al. ............... 713/155 |
| 7,055,029 B2* | 5/2006 | Collins et al. ................. 713/161 |
| 7,103,529 B2 | 9/2006 | Zimmer |
| 7,127,579 B2 | 10/2006 | Zimmer et al. |
| 7,210,034 B2 | 4/2007 | Smith |
| 7,562,230 B2 | 7/2009 | Komarla et al. |

(Continued)

FOREIGN PATENT DOCUMENTS

| CN | 1685297 A | 10/2005 |
| CN | 1801091 A | 7/2006 |

(Continued)

OTHER PUBLICATIONS

Ng, "Trusted Platform Module TPM Fundamental", APTISS, Infineon Technologies Asia Pacific Pte Ltd, Infineon, Never Stop Thinking, Aug. 12, 2008, 40 pages.

(Continued)

*Primary Examiner* — M Elamin
(74) *Attorney, Agent, or Firm* — Barre Law Firm

(57) ABSTRACT

A data processing system may include a high integrity storage (HIS) device with a partition or cache that is protected from updates. The data processing system may perform a boot process in response to being reactivated. The boot process may include the operation of executing a boot object. During the boot process, before executing the boot object, the data processing system may retrieve a digest for the boot object from the protected cache of the HIS device. The digest may be a cryptographic hash value for the boot object. During the boot process, the retrieved digest may be extended into a platform configuration register in a trusted platform module of the data processing system. Other embodiments are described and claimed.

24 Claims, 8 Drawing Sheets

(56) References Cited

U.S. PATENT DOCUMENTS

| | | | |
|---|---|---|---|
| 7,725,703 | B2 | 5/2010 | Hunter et al. |
| 7,765,392 | B2* | 7/2010 | Cheng et al. ............... 713/2 |
| 8,544,092 | B2* | 9/2013 | Hermann et al. ............ 726/23 |
| 2002/0166072 | A1 | 11/2002 | Cromer et al. |
| 2005/0021968 | A1 | 1/2005 | Zimmer et al. |
| 2006/0090084 | A1 | 4/2006 | Buer |
| 2006/0155988 | A1 | 7/2006 | Hunter et al. |
| 2008/0082828 | A1* | 4/2008 | Jennings et al. ............. 713/176 |
| 2008/0244257 | A1 | 10/2008 | Vaid et al. |
| 2009/0259854 | A1 | 10/2009 | Cox et al. |
| 2009/0271641 | A1 | 10/2009 | Rothman et al. |
| 2009/0328195 | A1 | 12/2009 | Smith |
| 2011/0162077 | A1* | 6/2011 | Kadam ............... 726/26 |
| 2012/0036347 | A1 | 2/2012 | Swanson et al. |

FOREIGN PATENT DOCUMENTS

| | | |
|---|---|---|
| CN | 1954288 A | 4/2007 |
| CN | 101814035 A | 8/2010 |
| CN | 102279760 A | 12/2011 |
| KR | 10-0989977 B1 | 10/2010 |
| WO | 2012016086 A2 | 2/2012 |
| WO | 2013/101081 A1 | 7/2013 |

OTHER PUBLICATIONS

Ryan, "Introduction to the TPM 1.2", University of Birmingham, Draft of Mar. 23, 2009, Comments welcome, Mar. 23, 2009, pp. 1-16.

Wojtczuk et al., "Attacking Intel® Trusted Execution Technology", Invisible Things Lab(ITL), Black Hat DC, Washington, DC, USA, Feb. 18-19, 2009, 122 pages.

Intel, "Creating a Secure Computing Environment", Technology Brief, Intel® Trusted Execution Technology (Intel® TXT), Embedded Computing, Jan. 2, 2012, 2 pages.

Intel, "Software Development Guide, Measured Launched Environment Developer's Guide", Intel® Trusted Execution Technology (TXT), Document No. 315168-008, Mar. 2011, 112 Pages.

Intel, "Pre-EFI Initialization Core Interface Specification (PEI CIS)", Intel® Platform Innovation Framework for EFI, A Foundation Specification, Sep. 16, 2003, 196 pages, Version 0.9.

Sourceforge, "PI Boot Flow", From tianocore, Retrieved from "http://sourceforge.net/apps/mediawiki/tianocore/index.php?title=PI_Boot_Flow", accessed on Jan. 02, 2012, 3 pages.

Sourceforge, "PI Boot Phases", From tianocore, Image contributed by Intel Corporation, Jan. 27, 2010, 1 page.

Blum, "Security and Risk Management Strategies Blog: Still Can't Win the Core Wars", A Report from Black Hat, Feb. 23, 2009, 6 pages.

Trusted Computing Group, "TCG EFI Protocol", Incorporated, Specification, for TPM Family 1.1 or 1.2, Jun. 9, 2006, 18 pages, Version 1.20 Final, Revision 1.00.

Trusted Computing Group, "TCG PC Client Specific TPM Interface Specification (TIS)", TCG Published, Apr. 28, 2011, 103 pages, Specification Version 1.21, Revision 1.00.

Trusted Computing Group, "TCG Storage, Security Subsystem Class: Opal", TCG, Feb. 4, 2010, 83 pages, Specification Version 1.00, Revision 3.00.

International Search Report and Written Opinion for International Application No. PCT/US2011/067873, mailed Aug. 27, 2012, 9 pages.

Zimmer et al., "Trusted Platforms UEFI, PI and TCG-based firmware", White Paper by Intel Corporation and IBM Corporation, Sep. 2009, 50 pages.

Zimmer, "UEFI Networking and Pre-OS Security", Intel® Technology Journal I, 2011, 22 pages, vol. 15, Issue 1.

Zimmer, et al., "Uefi Today: Bootstrapping The Continuum", Intel® Technology Journal, Oct. 2011, 130 pages, vol. 15, Issue 1.

Errata, "Unified Extensible Firmware Interface Specification", Version 2.3.1, Errata A, Sep. 7, 2011, 2214 pages.

Trusted Computing Group, "TCG Storage Architecture Core Specification", TCG, Nov. 4, 2011, 318 pages, Specification Version 2.00, Revision 2.00.

International Preliminary Report on Patentability and Written Opinion received for PCT Patent Application No. PCT/US2011/067873, mailed on Jul. 01, 2014, 10 pages.

Office Action received for Chinese Patent Application No. 201180049417.1, mailed on Apr. 28, 2014, 12 pages of English Translation, 2 pages of Search Report and 7 pages of Chinese Office Action.

Notification Concerning Transmittal of the International Report on Patentability and Written Opinion received for PCT Patent Application No. PCT/US2011/067873, mailed on Jul. 10, 2014, 1 page.

* cited by examiner

METHODS AND APPARATUS FOR TRUSTED BOOT OPTIMIZATION

RELATED APPLICATIONS

This application is a United States national stage application claiming priority to PCT patent application serial no. PCT/US2011/067873, filed on 29 Dec. 2011, which is herein incorporated by reference in its entirety.

TECHNICAL FIELD

The present disclosure relates in general to trusted boot processes. More particularly, the present disclosure relates to optimizing trusted boot processes through the use of high integrity storage technology.

BACKGROUND

For purposes of this disclosure, to "reactivate" a data processing system is to turn on or reset the data processing system. Typically, when a data processing system is reactivated, it must complete a boot process before it is useful to a user. For instance, the boot process may include operations such as determining what types of hardware components are present and loading an operating system (OS). The objects that are loaded and/or executed in the boot process may be referred to as "boot objects." Also, the boot process may include different stages, such as a "pre-boot phase" and an "OS boot phase." For purposes of this disclosure, the pre-boot phase includes all of the operations executed by the data processing system starting with the first operation after reactivation and ending with transfer of control to an OS boot loader or the like. Accordingly, the OS boot phase starts when control is transferred to the OS boot loader. The pre-boot phase is typically managed by a basic input/output system (BIOS). The BIOS may also be referred to as "firmware."

In recent years, malware (e.g., computer viruses and rootkits) has been developed to attack low-level code, such as the OS kernel, the OS boot loader, or even the firmware. This type of malicious code may be difficult for anti-virus software to detect and remove, because it may operate at the same security level as the anti-virus software.

The Trusted Computing Group (TCG) has developed standards for trusted platform modules (TPMs) to help protect against such attacks. For instance, the TCG has published a document entitled "TCG PC Client Specific TPM Interface Specification (TIS)," Version 1.21, Revision 1.00, Apr. 28, 2011 (the "TPM Client Specification"). As explained in the TPM Client Specification, a TPM may provide for the secure generation of and storage of cryptographic keys. A TPM may also provide platform configuration registers (PCRs) for safely storing information about the current platform configuration. A TPM may also provide a cryptographic hash generator or "hash engine." A hash engine may be implemented in hardware, software, or a combination of hardware and software.

A trusted boot process may involve checking the integrity of a system object (or objects) that will be loaded prior to its (or their) loading. For instance, a system object may be run through the TPM's hash engine to generate a hash value for that object. The original object may be referred to as the "message," and the resulting hash value may be referred to as the "hash result," the "hash," or the "digest." Also, the process of hashing a message may be referred to as "measuring" the message, and the resulting digest may be referred to as the "measurement." A given object can be verified as not having been altered, relative to an original version of that object, by hashing the given version of the object and then comparing the resulting digest with a digest that is known to have been produced from the original version of the object. Consequently, the integrity of a computing platform can be trusted if digests for all of the loaded objects can be verified against known good digests, provided that the function (or functions) that is responsible for performing that verification can also be trusted. One way to verify a digest is through direct comparison against a list of known good digests for known good messages (i.e., through use of a "whitelist"). Another way is to report the digest to a third party that is trusted to determine and attest to whether or not the digest is good (i.e., through "attestation"). A data processing system that uses a whitelist for digest authentication may be said to perform a "secure boot" or "secure launch." A data processing system that uses attestation for digest authentication may be said to perform a "measured boot" or "measured launch." The term "trusted boot" covers both "secure boot" and "measured boot."

In a trusted boot process, the BIOS of the data processing system may use a TPM to establish a chain of trust which involves a basic function (or set of functions) that is trusted implicitly. That basic function may be referred to as the "root of trust." For instance, one of the initial functions to be executed by the BIOS upon boot of a data processing system may be a function for measuring and verifying the BIOS itself. That function may be referred to as the "static core root of trust for measurement" (SCRTM). For instance, the SCRTM may be code that is supplied by the platform manufacturer, as a subset of platform firmware that initializes and configures platform components.

In addition, once a hash value has been generated, it may be added to a PCR in the TPM. This process is known as "extending" the PCR. As explained in the TPM Client Specification, different PCRs may be used to store measurements for different types of boot objects. And the TPM may preserve the values in at least some of its PCRs during the life of a computing platform session, but then all PCRs may be initialized to a fixed value (e.g., 0) when the computer platform restarts or resets.

The TCG has also published standards for enhancing the security of storage devices such as hard disk drives. For example, the TCG has published a document entitled "TCG Storage: Security Subsystem Class: Opal," Specification Version 1.00, Revision 3.00, Feb. 4, 2010 (the "Opal Specification"). The stated purpose of the Opal Specification is as follows: "The Storage Workgroup specifications provide a comprehensive architecture for putting Storage Devices under policy control as determined by the trusted platform host, the capabilities of the Storage Device to conform with the policies of the trusted platform, and the lifecycle state of the Storage Device as a Trusted Peripheral."

As described in greater detail below, the present disclosure introduces techniques for optimizing trusted boot performance, using secure storage.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION OF ONE OR MORE EMBODIMENTS

Technology for "Creating a Secure Computing Environment" is described in the technology brief on Intel® "Trusted Execution Technology" (TXT) available at www.intel.com/technology/advanced_comm/322287.pdf. That brief describes various features that provide for trusted boot or protected launch. One of those features involves a BIOS authentication code module (ACM) consisting of signed binaries stored in the BIOS and helping to secure the boot process. Another feature involves the generation of binary hashes for all system software, with the results being stored in the TPM, and with new hash values verified with previous values before any software is allowed to start execution.

However, computing new hash values may take a great deal of time and may delay the loading of the OS. This delay may be reduced to some degree through hardware acceleration of the hash algorithm. However, stronger hash algorithms require more time to compute larger digests and continue to cause appreciable delay, even with hardware acceleration.

Figure 1:
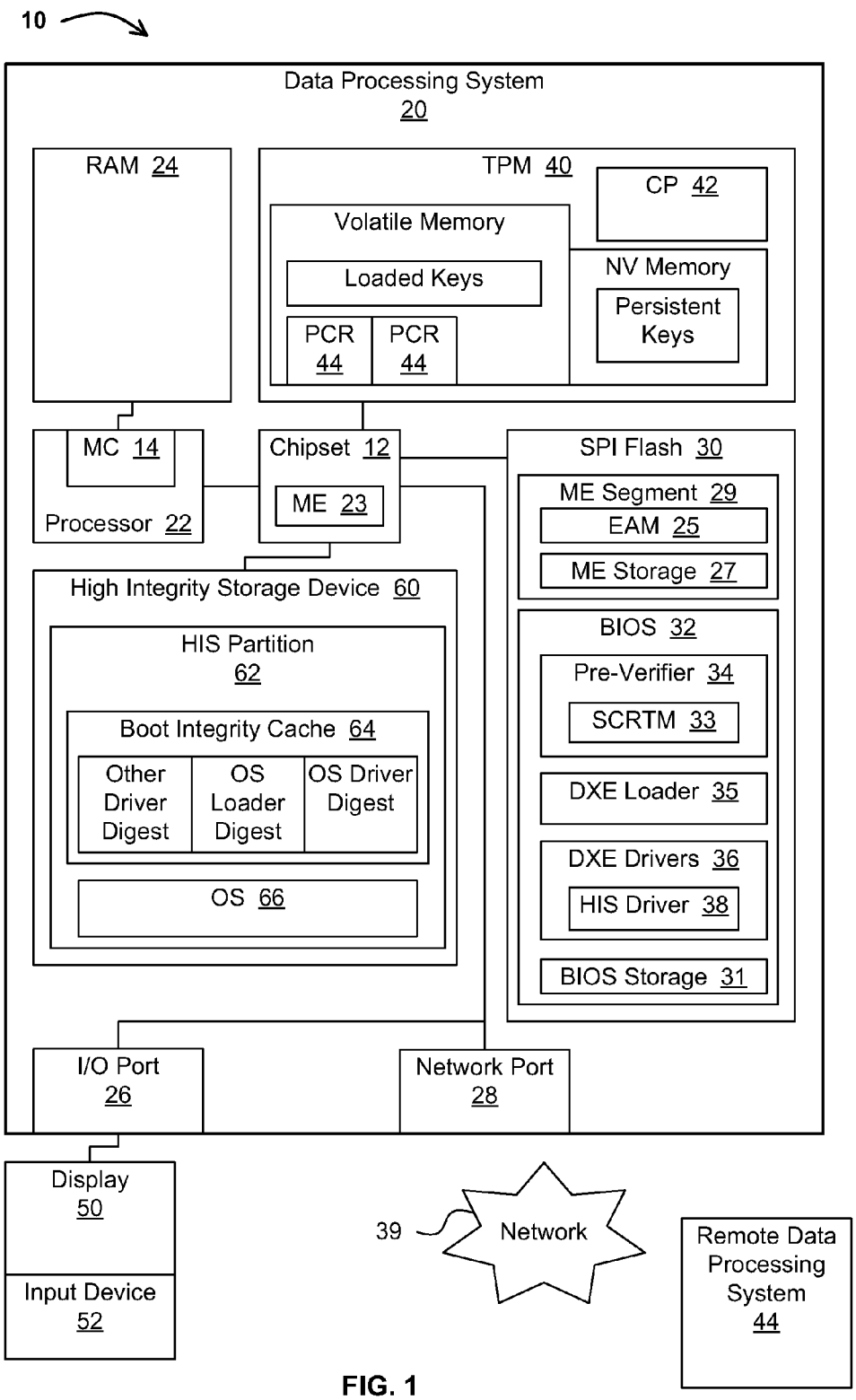
FIG. 1 is a block diagram of an example embodiment of a computing environment with a data processing system that uses a high integrity storage device to optimize secure boot performance.

FIG. 1 is a block diagram of an example embodiment of a computing environment 100 with a data processing system 20 that uses a high integrity storage (HIS) device 60 to optimize secure boot performance. In the embodiment of FIG. 1, the data processing system includes one or more central processing units (CPUs) or processors 22 in communication with other components such as random access memory (RAM) 24 and read only memory (ROM). For purposes of this disclosure, the term "ROM" may be used in general to refer to non-volatile memory devices including, without limitation, erasable programmable ROM (EPROM), electrically erasable programmable ROM (EEPROM), flash ROM, and flash memory. The processor may include a memory controller 14 to facilitate communication with the RAM, or the memory controller may be implemented independently, or as part of another component. The processor may communicate with other components via a chipset 12 or a peripheral controller hub (PCH). The ROM may be coupled to the chipset via a Serial Peripheral Interface (SPI) bus, and the ROM may be referred to as SPI flash 30.

Booting of the data processing system may be managed by a BIOS 32 residing at least partially in the SPI flash. The BIOS may include various boot objects that are loaded and/or executed during the boot process, such as a pre-verifier 34, an SCRTM 33, a driver execution environment (DXE) loader 34, and various other DXE drivers 36, including an HIS driver 38.

The processor may communicate with the SPI flash via a manageability engine (ME) 23. The ME may be implemented by a controller in the chipset and associated firmware. The ME may provide a variety of security and manageability capabilities in a pre-boot environment. As indicated below, those capabilities may include user authentication and user presence verification. The hardware and/or software control logic for performing user authentication and user presence verification may be referred to as an embedded access manager (EAM) 25. For example, the EAM may be implemented as firmware that runs on the ME. The capabilities of the ME may also include local area network (LAN) communication capabilities. The PCH or the ME may also control communications with other components, such as components on a bus backplane. However, in one embodiment, the processing system includes a Serial Advanced Technology Attachment (SATA) controller that is not accessibly by the ME.

During manufacturing the SPI flash may be partitioned by the platform manufacturer into segments for exclusive use by different components, such as a BIOS segment to contain the BIOS 32, an ME segment 29 to store firmware for implementing the ME, a LAN segment to facilitate LAN communications, etc. The ME segment may also include an ME storage area 27 for storing ME data. Similarly, the BIOS segment may include a BIOS storage area 31 for storing BIOS data.

The processor may also be connected to a non-volatile storage device 60, to a network adapter or port 28, to an input/output (I/O) port 26, and to I/O devices such as one or more displays 50 and one or more input devices 52 (e.g., a keyboard and a mouse). The storage device may be a hard disk drive (HDD), flash memory, or any other suitable storage technology. The network port may be used for communication between the data processing system and one or more remote data processing systems 44, via a LAN and/or a wide area network (WAN) 39, such as the Internet. The processor may also be connected to a TPM 40 that features a cryptographic processor (CP) 42, a nonvolatile memory for storing various persistent keys, and a volatile memory for storing various loaded keys, as well as various PCRs 44. The TPM may be a discrete chip attached to the motherboard and accessible via an SPI bus or via a Peripheral Component Interconnect Express (PCIe) bus, for example.

In one embodiment, the BIOS provides an extensible firmware interface (EFI). For instance, the BIOS may more or less follow established standards for operation, such as the standards set forth in version 2.3.1 of the Unified EFI (UEFI) Specification (the "UEFI Specification"), which is available on the Internet at www.uefi.org/specs/. For instance, Chapter 27 of the UEFI Specification provides details for some aspects of a process that may be used to perform secure boot. However, in some embodiments, those standards for operation may be further optimized or otherwise modified, according to the teachings provided herein. In other embodiments, the present teachings may be used by data processing system with other kinds of BIOSs. Furthermore, a data processing system may use technology features such as those referred to collectively as Intel® TXT to provide for security. Additional details concerning Intel® TXT may be obtained from the Technology Brief referenced above and from the Internet at www.intel.com/technology/security.

In the embodiment of FIG. 1, at least part of the storage device is managed by the HIS driver, and the HIS driver ensures that at least part of the storage device (e.g., an HIS partition 62) is locked into read-only mode throughout the boot process (and after the boot process), unless an authenticated administrator is applying an update, as indicated below. For purposes of this disclosure, the term "HIS device" may be used to refer to any device containing storage at least part of which stays locked into read-only mode unless a user has been authenticated to have update privileges during that particular user session. For instance, the data processing system may use techniques that are more or less like those described in the Opal Specification to secure the HIS device. In one embodiment, an entire storage device may be HIS aware. In another embodiment, only part of a storage device is configured as an HIS partition. In another embodiment, a storage device has multiple HIS partitions, with one reserved for OS use and another reserved for trusted boot use, for instance.

In addition, a boot integrity cache (BIC) 64 in the HIS partition contains hash values or digests for boot objects to be executed during boot. As illustrated, those digests may include, for instance, on or more "other driver" digests (referring to one or more digests for one or more objects "other" than the HIS driver), an OS loader digest, and one or more OS driver digests. When the data processing system performs a trusted boot, instead of recomputing those hash values, the data processing system may retrieve the hash values from the HIS device, and the hash values may be used to extend TPM PCRs. A read operation to retrieve a hash value from an HIS device may be an order of magnitude faster than a comparable hash algorithm computation. As illustrated, in addition to a boot integrity cache, the HIS partition may also contain an OS image 66.

As described in greater detail below, the BIOS may establish a chain of trust to the HIS device, starting with a valid root of trust and proceeding to include a trusted driver for the HIS device. Once the HIS device has been included in the chain of trust, the HIS driver may be used to read digests for boot objects from the boot integrity cache of the HIS device. In some embodiments, one or more of the boot objects are also read from HIS devices. In other embodiments, one or more of the boot objects are read from the ROM, and/or from one or more other devices.

Figure 2A:
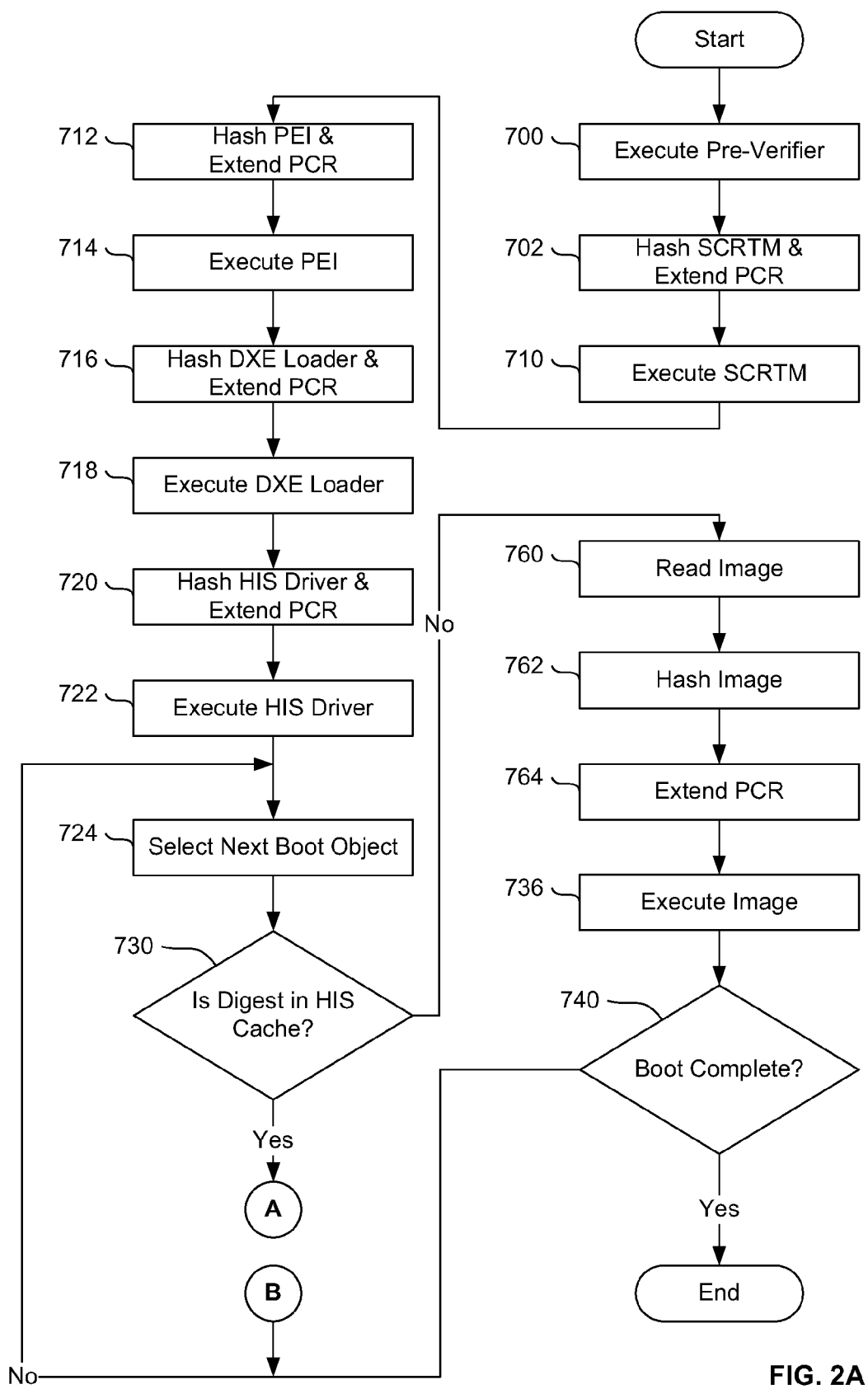
FIGS. 2A, 2B, and 2C present a flowchart of an example embodiment of an optimized secure boot process.
Figure 2B:
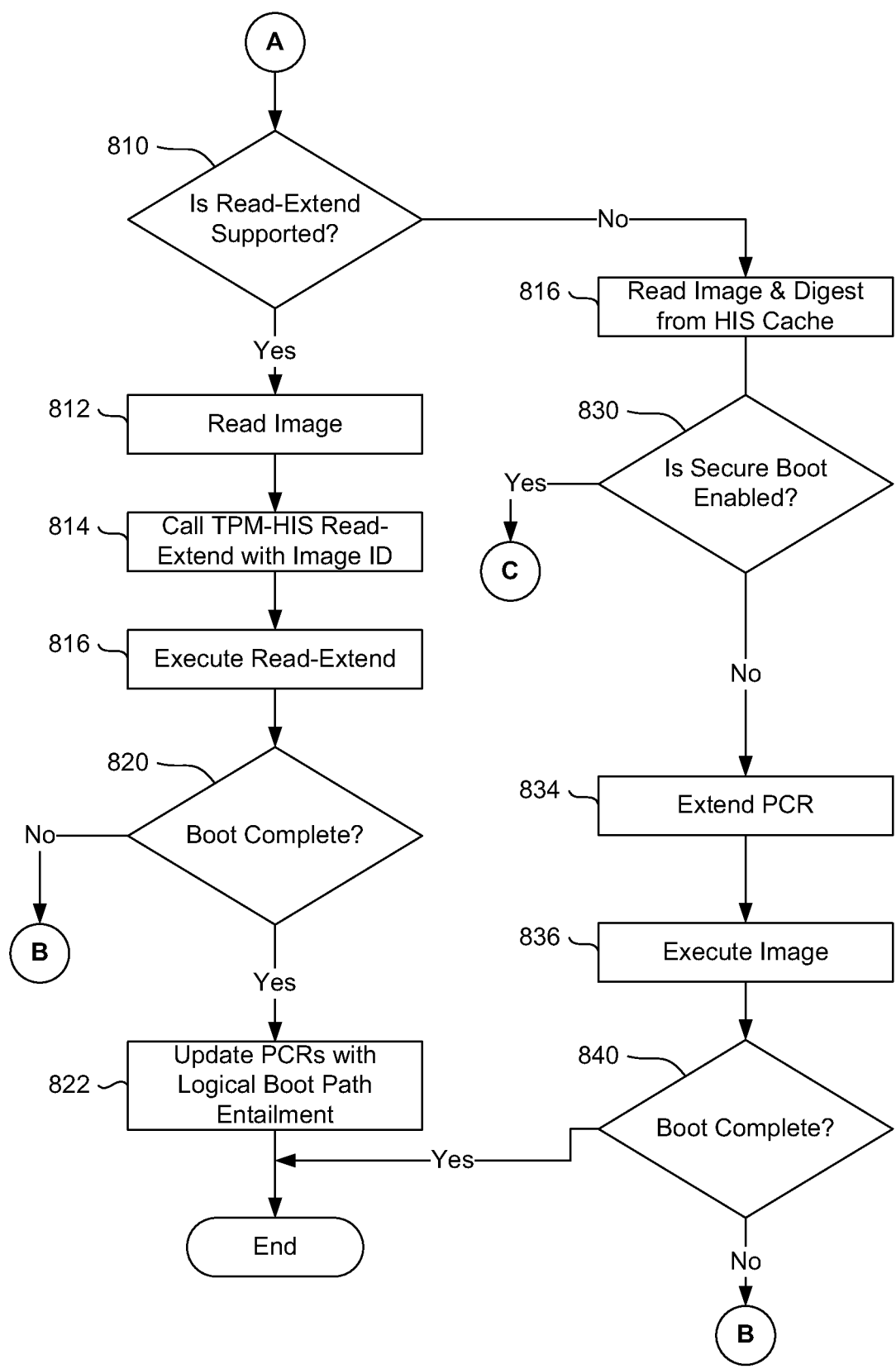
Figure 2C:
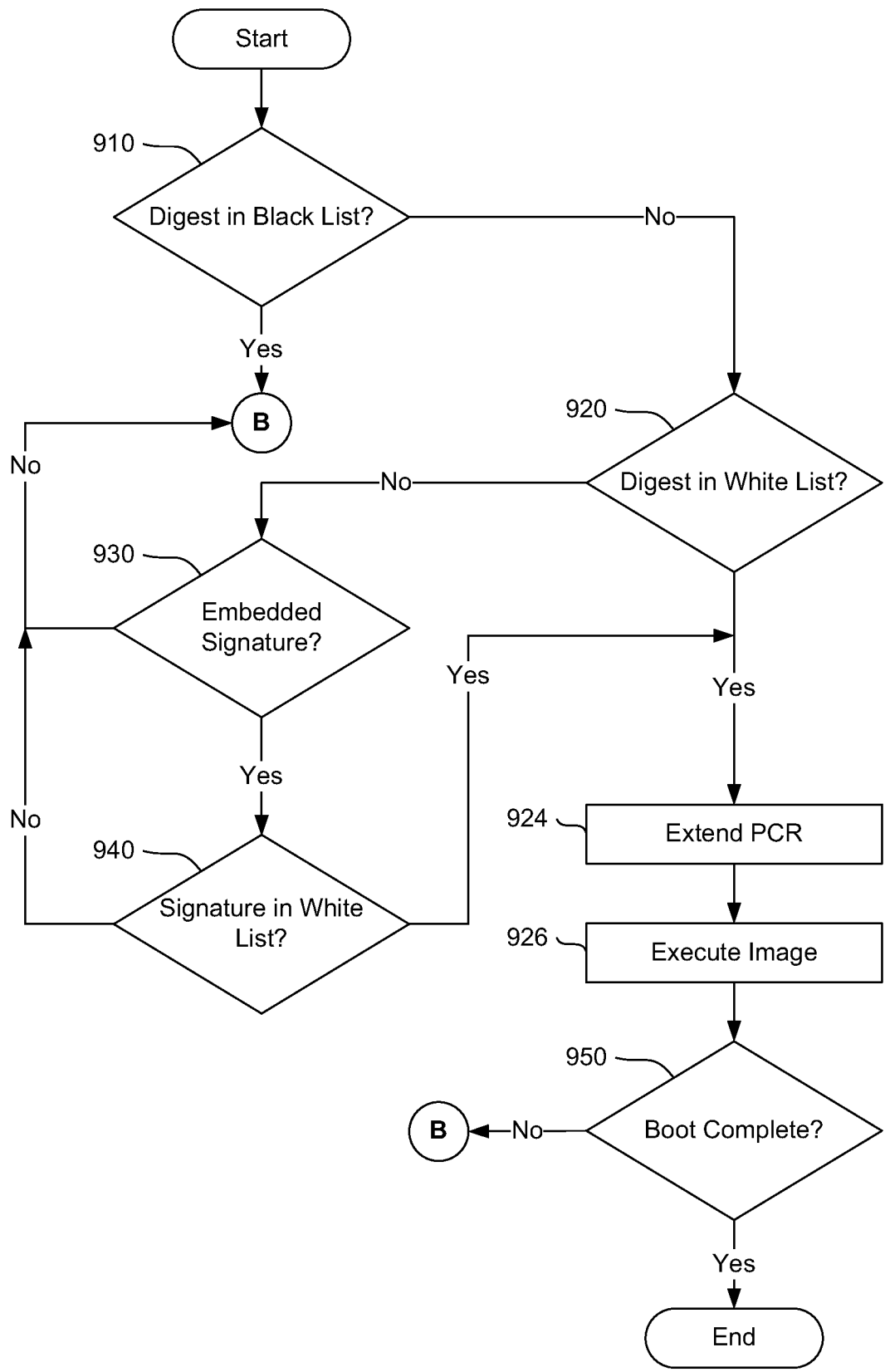
Figure 3:
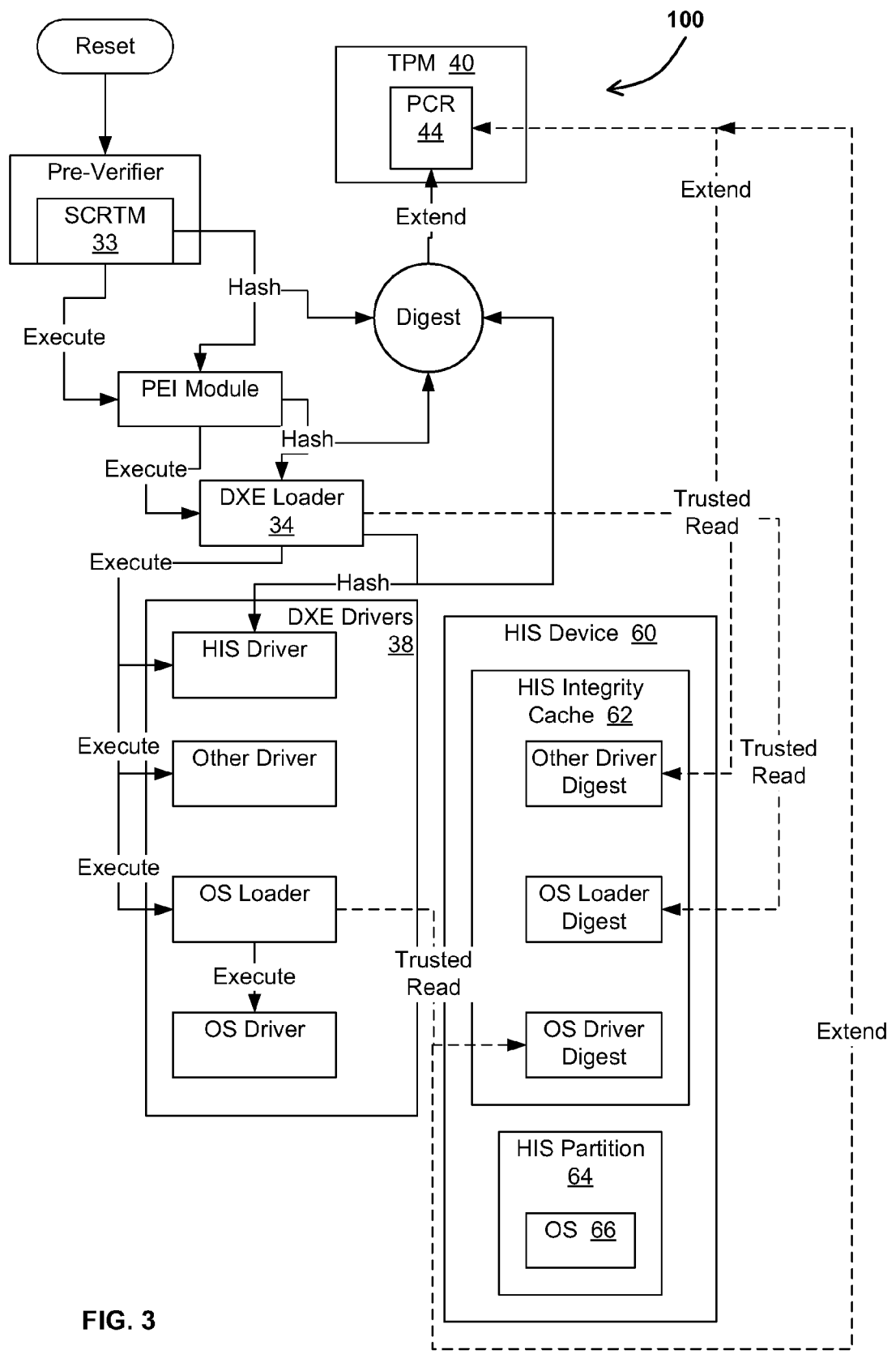
FIG. 3 is a block diagram illustrating various components and operations associated with the process of FIGS. 2A, 2B, and 2C.

FIGS. 2A, 2B, and 2C present a flowchart of an example embodiment of an optimized secure boot process, with regard to data processing system 20 from FIG. 1. And FIG. 3 is a block diagram illustrating various components and operations associated with the process of FIGS. 2A, 2B, and 2C. The process of FIG. 2A starts with reactivation of the data processing system, immediately followed by execution of the pre-verifier, as indicated at block 700. In an embodiment like that of FIG. 1, the pre-verifier may be implemented as an ACM. Accordingly, the ACM will verify the pre-verifier, possibly based on a whitelist stored in the SPI flash. In another embodiment, the pre-verifier may be implemented as microcode stored in the processor or in the chipset, possibly as part of the ME. If implemented as microcode, the pre-verifier may be considered a hardware root of trust. The pre-verifier may then use the CP (cryptographic processor) of the TPM to hash the SCRTM from the system ROM, and may then extend the resulting digest into a PCR of the TPM, as shown at block 702. The pre-verifier then launches the SCRTM.

In one embodiment, the SCRTM is similar to a TXT secure initialization (SINIT) ACM, but with the SCRTM also testing for the presence of a boot integrity cache in the data processing system. The SCRTM may also consult a launch control policy (LCP) to determine whether the boot process should use the HIS partition. The LCP may be specified by settings saved in the system ROM, for instance. In response to detecting that a boot integrity cache is present and that the LCP does not prevent use of the boot integrity cache, the SCRTM may construct a message indicating that the BIOS is using the boot integrity cache option. In other words, the message may indicate that HIS boot acceleration is being used. Accordingly, the message may be referred to as boot configuration data indicating whether the HIS device was used during the boot process. The SCRTM may hash-extend that message into a PCR (where "hash-extend" means the message is hashed and the resulting digest is extended into a PCR). The SCRTM may also record that message in an event log associated with the TPM. The event log may be called a PCR log, and each log entry may contain the PCR number, the value that was extended into the PCR, and a log message indicating what was measured.

Additional details on UEFI measured boot operations may be found in chapter 10 of the book entitled "Beyond BIOS $2^{nd}$ Edition: Developing with the Unified Extensible Firmware Interface," which may be ordered from the Internet at www.intel.com/intelpress/sum_efi2.htm, and from the whitepaper entitled "Trusted Platforms: UEFI, PI and TCG-based firmware," which may be downloaded from the Internet at http://download.intel.com/technology/efi/SF09_EFIS001_UEFI_PI_TCG_White_Paper.pdf. Subsequently, another party (the "verifier") can determine, based on the PCR log, whether the data processing system used HIS boot acceleration (e.g., whether the data processing system extended digests from cached values rather than directly computing those digests in real time). In one embodiment, validation of the PCR log requires attested PCR values which are obtained from the TPM and which are signed by the TPM using an Attestation Identity Key (AIK). The PCR log directs the verifier on how to interpret and apply the PCR values such that they are meaningful. If the verifier has a policy against using HIS boot acceleration, then the verifier may decide to disallow access by the data processing system to resources protected by the verifier, or the verifier may apply some other compensating transaction to mitigate risk.

The SCRTM may then use the CP of the TPM to hash a pre-EFI initialization (PEI) module from the system ROM, and may then extend the resulting digest into a PCR, as indicated at block 712. As shown at block 714, the SCRTM may then launch the PEI module. The PEI module may then hash the DXE loader and extend that digest into a PCR, as shown at block 716. The PEI module may then launch the DXE loader, as shown at block 718. As depicted at block 720, the DXE loader may then hash the HIS driver and extend that digest into a PCR. The DXE loader may then launch the HIS driver, as shown at block 722. The HIS driver may then initialize the HIS subsystem by powering up the HIS device and configuring it so it is able to service read operations, while disallowing write or update operations.

Subsequently, the DXE loader may launch various additional objects, and at least in some cases, before launching those objects, the DXE loader may read the digests for those objects from the boot integrity cache, instead of hashing those objects. For instance, the system ROM may contain an LCP which specifies some or all of the boot objects to be used during the boot process, and the DXE loader may process some or all of those objects according to the following process. The DXE loader may select the next boot object to be processed, as shown at block 724. As indicated at block 730, the DXE loader may then determine whether there is a digest for that object in the boot integrity cache. If there is no digest in that cache, the DXE loader may read the object's image from a primary source (e.g., from the system ROM or from an option ROM), as indicated at block 760. The DXE loader may then use the CP to hash that image, and may extend the resulting digest into a PCR, as indicated at blocks 762 and 764. The DXE loader may then launch the object, as shown at block 736. As shown at block 740, if boot is complete, the process may then end. However, if there are more boot objects to be processed, the process may return to block 724, and the DXE loader may select the next boot object to be loaded and/or executed.

However, referring again to block 730, if the DXE loader determines that the boot integrity cache has a digest for the selected boot object, the process may pass through page connector A to block 810, which shows the DXE loader determining whether the platform supports a "read-extend" operation.

According to one example embodiment, a TPM may include an integrated HIS device or HIS partition capable of providing a persistent boot integrity cache. Consequently, the TPM may directly access the cached hash values stored on that HIS partition. The TPM may also extend those cached hash values into PCRs. The read-extend operation or instruction causes the TPM to extend a specified digest directly from the boot integrity cache of the TPM to a PCR of the TPM. The read-extend operation thus allows the DXE loader to avoid reading the digest from another source (e.g., the system ROM) and then supplying the digest to the TPM. Integration of this kind may speed up the trusted boot process by combining two operations into one. In addition, an integrated HIS-TPM device may perform fewer internal extend operations by utilizing the read-extend interface only for short sequences or small images, such as an option ROM DXE driver consisting of a single code module that is easy to hash. By contrast, in one embodiment, read-extend may be avoided for boot objects which include code that applies trusted boot logic to one or more tertiary modules.

Alternatively, when the TPM has an integrated boot integrity cache, the TPM PCR values from a trusted boot may be stored in the boot integrity cache. Then, during a subsequent boot, those PCR values may be extended to the corresponding PCRs at the end of the trusted boot process, instead of an extend operation being executed for a boot object digest each time a boot object is launched.

In one embodiment, the HIS driver may proxy communications between the TPM and the HIS device and between the ME and the HIS device. In other words, for communications between the HIS device and the ME and/or the TPM, instead of using BIOS and host drivers that may not be trusted to protect integrity of measurements, the HIS driver may be used as the mechanism through which access to the HIS partition on the TPM is exposed. In another embodiment, chipset hardware for a virtualization engine (VE) such as a virtualization engine digital-to-analog converter (VEDAC) may be used for direct access to the HIS device, for example via an SATA controller. The VE/VEDAC hardware may allow the ME to communicate directly to the storage subsystem without requiring a host or BIOS storage driver. The VE/DAC may also be referred to as a storage controller hub (SCH). The HIS device may be attached to the SCH. In addition, the TPM may be implemented in the ME, and such an ME may be referred to as a converged security engine (CSE). The ME and the SCH may communicate directly, without indirection through the host BIOS or OS.

Referring again to block 810, if read-extend is not supported, the DXE loader may read the digest from the boot integrity cache, as shown at block 818. The DXE loader may also read the boot object image from that cache at block 818. For instance, in some embodiments, some or all of the boot objects themselves may also be stored in the boot integrity cache (or in some other part of the HIS partition). Such boot objects may be referred to as "HIS protected boot images." A data processing system that stores the boot objects and the digests for those objects in the HIS partition may provide stronger security than a data processing system that does not store the boot objects in the HIS partition.

As shown at block 830, the DXE loader may then determine whether secure boot is enabled. If secure boot is not enabled, the DXE loader may extend the digest into a PCR and then launch the object, as shown at blocks 834 and 836.

As shown at block 840, if the boot process is then complete, the process may end. Otherwise, the process may return through page connector B to block 724, with the DXE loader selecting the next boot object to process.

However, if secure boot is enabled, the process may pass from block 830 through page connector C to block 910, with the DXE loader determining whether the digest matches any entries from a "black list" of disallowed objects. If so, the process passes through page connector B to block 724, with the DXE loader discarding the blacklisted object by selecting the next boot object without extending the digest of the blacklisted object to a PCR and without launching the blacklisted object.

Referring again to block 910, if the digest is not in the blacklist, the DXE driver determines whether the digest is in a "white list" of approved digests, as shown at block 920. As indicated at block 930, if the digest does not match any entries in the whitelist, the DXE loader determines whether the object has an embedded digital signature (e.g., a signature for a UEFI Portable Executable-Common Object File Format (PE-COFF) executable.) Such signatures may be created using the technology referred to by the trademark "Authenticode," for example, or using any other suitable technology. If the object contains an embedded digital signature, that signature may be compared to entries in a whitelist of approved signatures, as indicated at block 940. If the signature is found in the whitelist, the digest may be extended to a PCR, and then the object may be launched, as shown at blocks 924 and 926. Then, as shown at block 950, if boot is not complete, the process may return through page connector B to block 724, with the DXE loader selecting the next boot object to process. Or, if there are no more objects to process, the process may end. However, referring again to blocks 940 and 930, if the signature is not in the whitelist, or if the object contains no digital signature, the process may return through page connector B to block 724, with the object being discarded, as indicated above.

Referring again to block 810, if read-extend is supported, the DXE loader may read the image of the boot object from its primary source or from the HIS partition, as shown at block 812. The DXE loader may then execute a read-extend instruction or otherwise issue a read-extend request to the TPM, where the request includes an identifier for the boot object, as indicated at block 814. In response, the TPM may use a copy of the digest for the boot object, from the boot integrity cache of the TPM, to extend a PCR, as shown at block 816. Then, as shown at block 820, if there are still more boot objects to process, the process may return through page connecter B to block 724. Otherwise, as shown at block 822, the DXE loader may update the PCRs with the logical boot path entailment. For instance, the UEFI firmware may determine that the digest for a boot target (e.g., a boot target referenced in the UEFI boot options) has been recorded (e.g., into PCR[4]) on a former boot, that the digest for disk geometry information has been recorded (e.g., into PCR[5]) on a former boot, and/or that other digests have previously been recorded. Consequently, the DXE loader may update the PCRs with the logical boot path entailment by updating the PCRs with these former resultant measurement hashes from the HIS cache, without re-executing the associated hash computations. The process may then end.

The table below lists some sample hash computation times that may be avoided.

| Input size: | SHA1 (average time in milliseconds) | SHA256 (average time in milliseconds) |
| --- | --- | --- |
| 128 KB | 2.6 | 4.3 |
| 256 KB | 4.2 | 7.4 |
| 512 KB | 7.1 | 13.6 |
| 1 MB | 13.0 | 26.0 |
| 2 MB | 24.8 | 50.8 |

FIG. 3 is a block diagram illustrating various components and operations associated with process depicted in FIGS. 2A, 2B, and 2C. For instance, the different arrows labeled "hash" indicate that certain components (such as the SCRTM) use the CP of the TPM to hash other components (such as the PEI module). In addition, the arrows that lead from the hash arrows to the "Digest" circle, and then (through the "Extend" arrow) to the PCR, indicate that the hash results for each object are extended into a PCR before that object is launched. In addition, FIG. 3 shows that, in one embodiment, some of the boot objects (e.g., the "other" driver, the OS loader, and the OS driver(s)) are read from the system ROM, while corresponding digests are read from the boot integrity cache of the HIS device. For instance, the OS drivers may be subject to integrity checks by the OS loader or the OS kernel if the secure boot process is continued beyond the BIOS. This technique may be used to further accelerate the secure boot process. For instance this technique may be used to verify a class of drivers called Early Launch Anti-malware (ELAM), which may be the first drivers to be loaded by the OS kernel. The OS loader or OS kernel may obtain whitelisted drivers from the HIS integrity partition. Subsequent drivers to be loaded could also have whitelist images in the HIS integrity partition.

Also, the "Execute" arrows signify how control is passed. For instance, the SCRTM launches the PEI module, and the PEI module launches the DXE loader, but then the DXE loader launches multiple objects in sequence, with control returning to the DXE loader after each of those objects (other than the OS loader) finishes executing. In addition, the dashed arrows labeled "trusted read" signify that the DXE loader (and the OS loader) use a trusted HIS driver to read the digests from the boot integrity cache of the HIS partition, rather than computing those digests dynamically after the driver image is read from disk. And the dashed "Extend" arrows signify that the digests from the trusted read operations are extended into a PCR.

Figure 4:
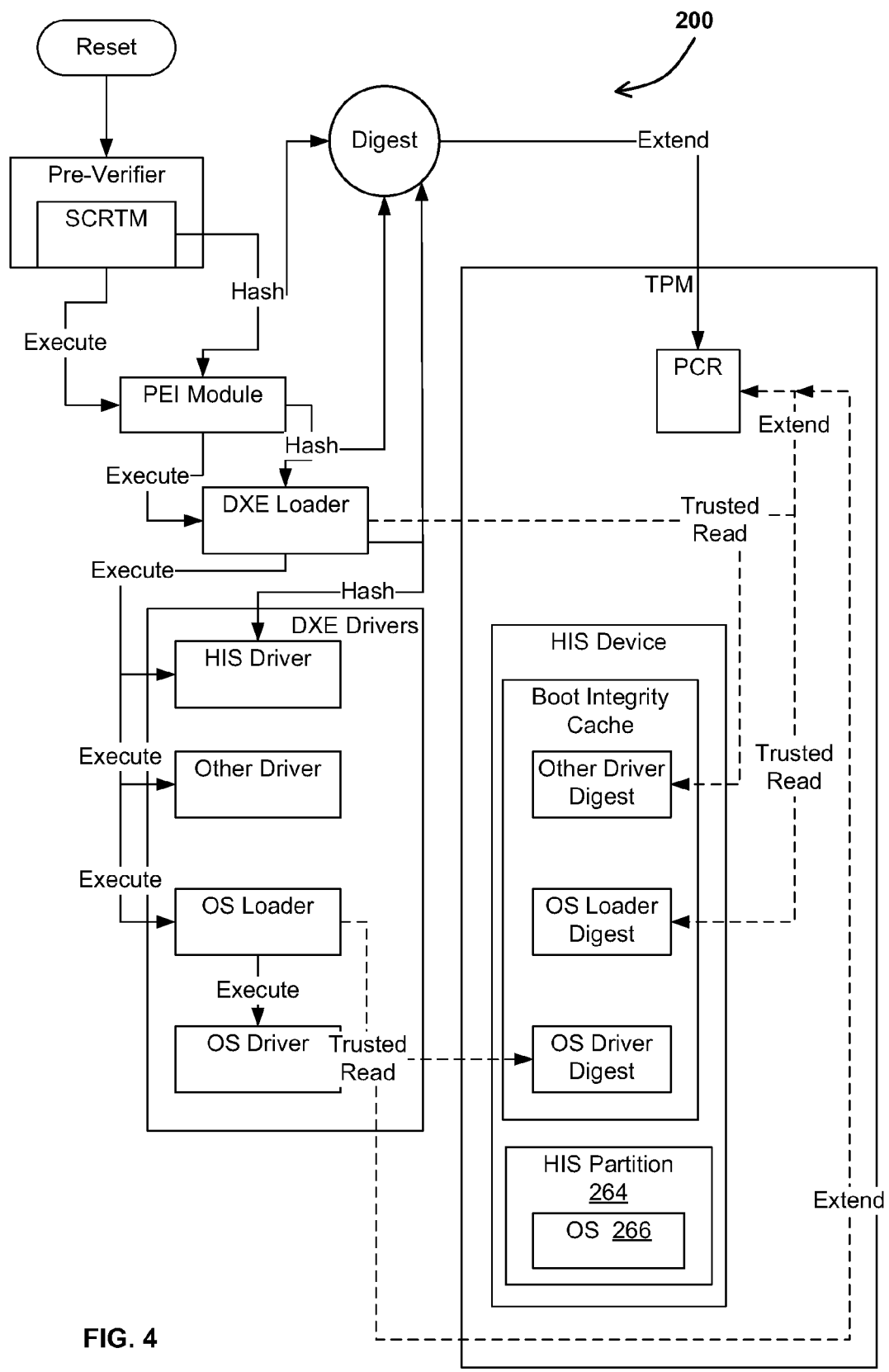
FIG. 4 is a block diagram illustrating various components and operations associated with another example embodiment of an optimized secure boot process.

FIG. 4 is a block diagram illustrating various components and operations associated with an alternative embodiment of an optimized secure boot process. The embodiment of FIG. 4 is similar to the one of FIG. 3, but in FIG. 4 the TPM includes storage that serves as an HIS device, with a boot integrity cache. Consequently, read-extend operations may be used to extend the digests for boot objects into the PCR without reading those digests from system ROM or from option ROMs.

Figure 5:
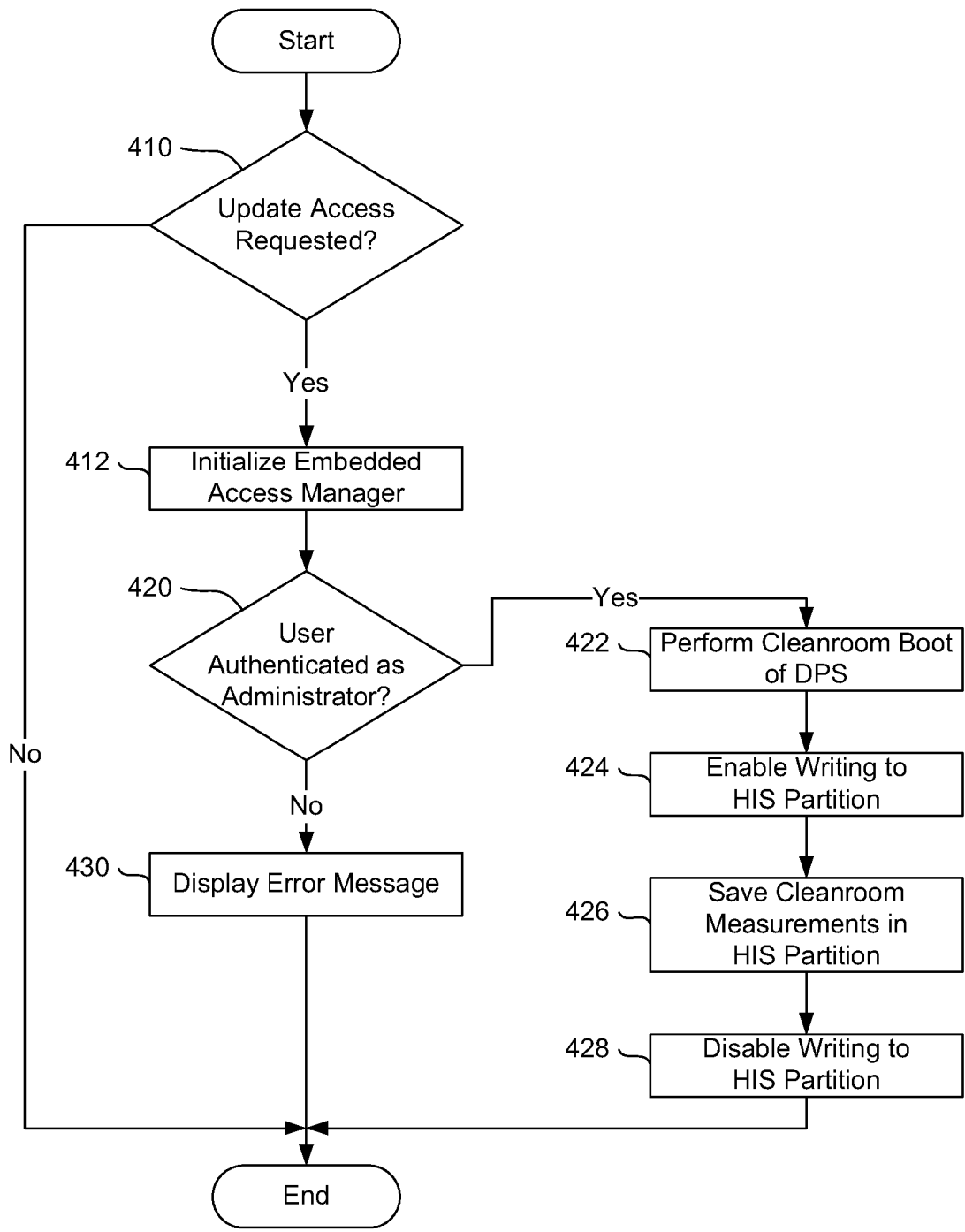
FIG. 5 presents a flowchart of an example embodiment of a process for preparing a data processing system for an optimized secure boot process.

FIG. 5 presents a flowchart of an example embodiment of a process for loading a digest into the boot integrity cache of a data processing system (e.g., data processing system 20 from FIG. 1), to prepare the data processing system for an optimized secure boot process. As indicated above, the HIS partition is locked into read-only mode unless an authenticated administrator is applying an update. The data processing system may include various features for reliably authenticating an administrator, such as the ME depicted in FIG. 1.

The process of FIG. 5 may start with reactivation of the data processing system. At an early stage of the pre-boot process, a user may request access to update the HIS partition. For instance, the DXE loader may detect such a request between steps 722 and 724 of the process depicted in FIG. 2A. As indicated at blocks 410 and 412 of FIG. 5, in response to detecting a request for update or write access to the HIS partition, the DXE loader may initialize the embedded access manager. For example, the DXE loader may power up the sensors and other authentication devices to be used for authenticating a user and establishing a user presence session, and the DXE loader may and initialize those devices with a default state to make those devices ready for receiving end user input. The DXE loader may then launch the embedded access manager. As indicated at block 420, the embedded access manager may then perform user authentication to verify whether the user has been approved for administrator privileges.

Figure 6:
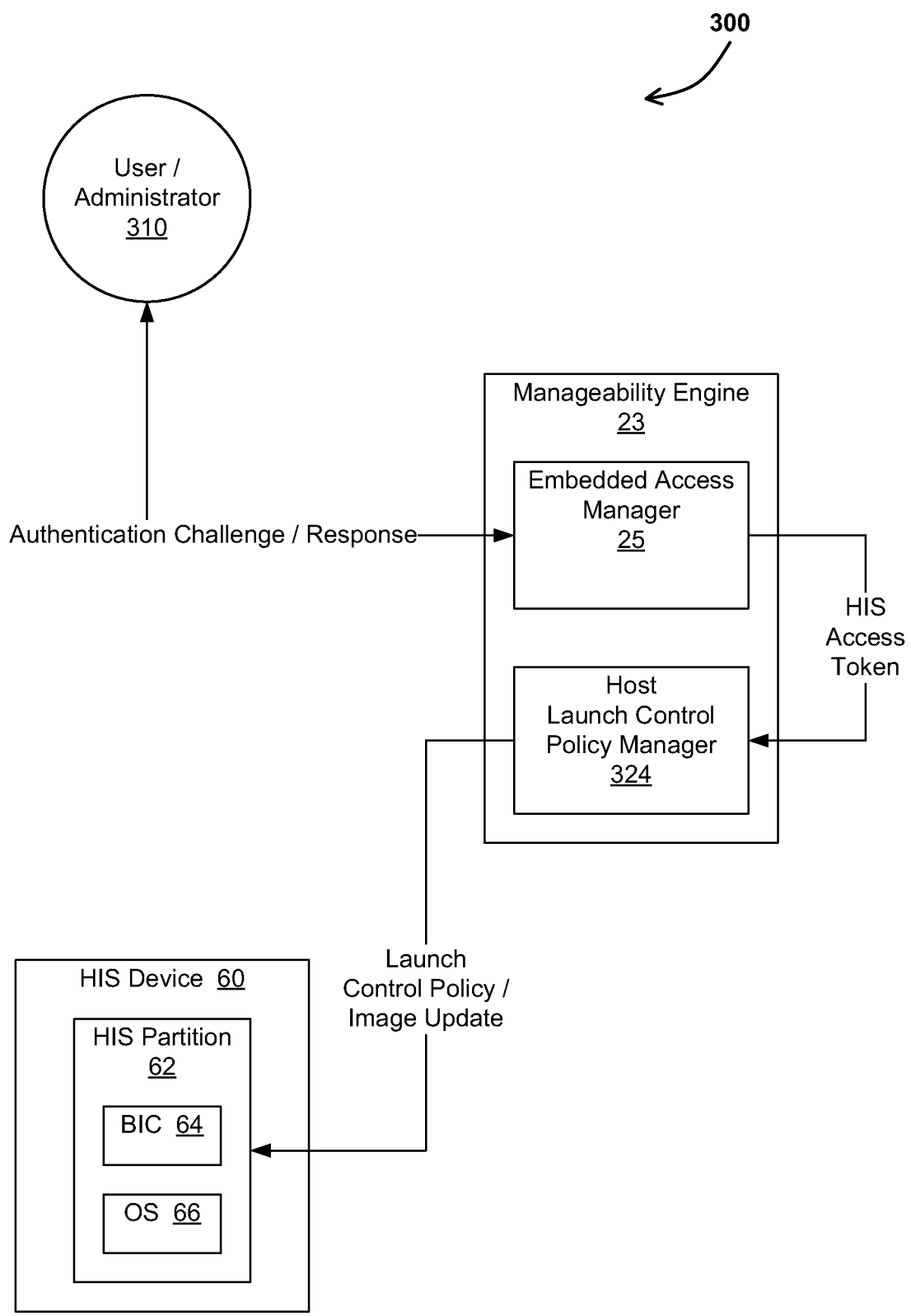
FIG. 6 is a block diagram illustrating various components and operations associated with the process of FIG. 5.

FIG. 6 illustrates various components and operations that may be used for the user authentication. For example, FIG. 6 shows interactions between the user 310 and the embedded access manager 25, including an authentication challenge from the embedded access manager and a corresponding response from the user. The embedded access manager thus requires the user to prove that he or she is authorized to update the HIS partition. This pre-boot authentication (PBA) may require the user to provide a userid and at least one credential. Credentials may include, without limitation, (1) something the user knows (e.g., a password), (2) something the user is (e.g., through use of a fingerprint or an iris scan) and/or (3) something the user owns (e.g., a USB dongle). These operations may be similar to the operations used for conventional hard drive password capabilities. Some embodiments may use the user identity infrastructure described in chapter 31 of the UEFI Specification. To perform user authentication, the embedded access manager may check the userid and credentials against a predetermined list of approved users and associated credentials, to determine whether the user is subscribed with update or administrator privileges.

After the embedded access manager has authenticated the user as an administrator, the embedded access manager may construct a credential (e.g., a password) that the HIS device can recognize and validate. This credential may be referred to as an "access token." The access token may be passed to the host (or BIOS) Launch Control Policy Manager (LCPM), and the LCPM may then determine whether HIS accelerated trusted boot is desired. If so, the LCPM may extend a PCR in the TPM with data indicating that HIS trusted boot acceleration is being enabled. The LCPM may then unlock the HIS partition by presenting the access token to the HIS device, via the HIS driver. The LCPM may then apply the updates to the HIS partition. For instance, the LCPM may write a digest for a boot object to the boot integrity cache, possibly along with an image of that boot object.

However, referring again to block 420 of FIG. 5, if the user authentication fails, an error message may be displayed, as shown at block 430, and the process may end with no updates being applied to the HIS partition.

In addition, when user authentication succeeds, if the data processing system has never before used the boot integrity cache option, certain operations may be performed to establish the initial configuration to enable use of the boot integrity cache. For instance, as shown at block 422, the data processing system may perform a cleanroom boot. For example, once administrator access has been granted, the ME may allow the administrator to set a BIOS configuration bit that grants write permission to the HIS partition. Once that bit is set, the system can be rebooted without security enforcement in place. Accordingly, as shown at block 424, the ME may enable writing to the HIS partition. Then, as shown at block 426, the ME may perform a cleanroom boot and save the digests for boot objects that were processed during the cleanroom boot in the boot integrity cache, for instance as described above with regard to FIG. 6. The administrator may perform the cleanroom boot when (a) the administrator believes the system is not currently under attack by malware (e.g., after the administrator has performed a malware scan), (b) the system is not connected to any untrusted networks, and (c) the system is in a location (e.g., an information technology (IT) lab) that is protected by physical security (e.g., a locked door). This defines the "cleanroom" conditions under which the administrator is willing to enter the administrator password. As shown at block 428, after the cleanroom boot measurements have been saved to the HIS partition, the ME may re-lock the HIS partition, and the process may then end.

Similar operations may be performed to allow an authenticated administrator to update the HIS partition after the boot integrity cache has already been used. For instance, if the administrator has added an adapter card with an option ROM containing a driver that is trusted by the administrator, the administrator may request update access to the HIS device after installing that adapter card. The process described above may then be used to save the digest for the new driver and a copy of the new driver to the boot integrity cache, thereby updating the baseline system measurements. The same kind of process may be used for other updates, including, without limitation, system BIOS updates.

In addition, the embedded access manager may enforce user presence requirements for all updated to the HIS partition. For instance, the embedded access manager may require that the user remain present at the data processing system for the duration of the session during which updates are being attempted. The data processing system may use proximity sensors to detect when the user is no longer nearby. If the embedded access manager detects that the user is no longer present, the user presence session is lost. In response, the embedded access manager rescinds the access privileges that were granted in response to authentication. In other words, the ME may relock the HIS partition against writes. This requirement for continual presence may be referred to as a requirement for a "user presence session."

As has been described, a data processing system may optimize trusted boot performance by reading boot object digests from a boot integrity cache instead of performing cryptographic hash computations to generate those digests. The BIOS for the data processing system may include an implicitly trusted pre-verifier, and then digests for all subsequent boot objects, up to and including an OS boot loader or comparable software, such as a virtual machine monitor (VMM) loader, may be extended into PCRs. The data processing system may thus create a measured launch environment (MLE). The measurements for the MLE may then be used to verify that none of the components of the launch environment have been tampered with.

In one embodiment, the MLE may be implemented as the code that is directly measured by the SCRTM. For instance, the MLE may be a virtual machine monitor (VMM) loader. This MLE may be an "early launched" MLE, or a hypervisor in the BIOS itself. Additional detailed for such implementations may be found in the following documents:

U.S. Pat. No. 7,103,529, entitled "A Method For Providing System Integrity And Legacy Environment Emulation;"

U.S. patent application pub. no. 2009-0119748, entitled "System Management Mode Isolation In Firmware;"

U.S. Pat. No. 7,827,371, entitled "Method For Isolating Third Party Pre-Boot Firmware From Trusted Pre-Boot Firmware;" and U.S. patent application pub. no. 2009-0249053, entitled "Method And Apparatus For Sequential Hypervisor Invocation."

The criteria used for determining MLE efficacy on some platforms may be provided by the LCP. For instance, the LCP may include information like that in UEFI whitelists and blacklists.

Regarding the digests that are extended into PCRs during the trusted boot process, in one embodiment, all of the digests may be extended into the same PCR. In other embodiments, different PCRs may be used for different digests.

In some embodiments, the trusted boot process may execute quickly enough to allow the data processing system to be characterized as "instant on." In one embodiment, the data processing system reads the digests from an HIS partition on an HDD. Because the HIS partition is write protected during boot, there is reduced chance for an attacker to introduce malware via a boot object. Since the HIS driver is trusted, by virtue of the PEI and platform root of trust having performed traditional trusted boot, there is no increased risk of runtime attacks on the launch. Access to the HIS partition is controlled by the embedded access manager, which uses strong authentication to allow only authorized administrators to update images in the HIS partition.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Also, components that are described as being coupled to each other, in communication with each other, as being responsive to each other, or the like, need not be in continuous communication with each other or directly coupled to each other, unless expressly specified otherwise. In addition, some components of the data processing system may be implemented as adapter cards with interfaces (e.g., a connector) for communicating with a bus. Alternatively, devices may be implemented as embedded controllers, using components such as programmable or non-programmable logic devices or arrays, application-specific integrated circuits (ASICs), embedded computers, smart cards, and the like.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, flash memory, etc. Alternatively, some or all of the control logic for implementing the described operations may be implemented in hardware logic (e.g., as part of an integrated circuit chip, a programmable gate array (PGA), an ASIC, etc.). Instructions may also be used in a distributed environment, and may be stored locally and/or remotely for access by single or multi-processor machines.

For purposes of this disclosure, the term "program" is used in general to cover a broad range of software constructs, including applications, functions, procedures, routines, modules, drivers, subprograms, processes, and other types of software components. Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims and all equivalents to such implementations.

What is claimed is:

1. A method for booting a data processing system, the method comprising:
   in response to a data processing system being reactivated, performing a boot process for the data processing system, wherein the operation of performing the boot process comprises executing a boot object, and wherein the data processing system comprises a high integrity storage (HIS) device with a cache that is protected from updates; and
   during the boot process, before executing the boot object, retrieving a digest for the boot object from the protected cache of the HIS device, wherein the digest comprises a cryptographic hash value for the boot object;
   wherein the method further comprises at least one operation from the group consisting of:
      during the boot process, using the retrieved digest for the boot object to extend a platform configuration register (PCR) in a trusted platform module (TPM) of the data processing system; and
      during the boot process, before retrieving the cached digest for the boot object from the protected cache of the HIS device, automatically setting the protected cache of the HIS device to read-only mode.

2. At least one non-transitory machine accessible medium comprising:
   instructions which, when executed by a data processing system, enable the data processing system to perform the method recited in claim 1.

3. At least one non-transitory machine accessible medium according to claim 2, wherein the instructions, when executed, enable the data processing system to perform further operations comprising:
   hashing the boot object to generate the digest of the boot object; and
   saving the digest of the boot object in the protected cache of the HIS device.

4. At least one non-transitory machine accessible medium according to claim 2, wherein the instructions, when executed, enable the data processing system to perform further operations comprising:
   determining whether a user of the data processing system has been authorized to update the protected cache; and
   setting the protected cache of the HIS device to writeable mode only after determining that the user has been authorized to update the protected cache.

5. At least one non-transitory machine accessible medium according to claim 4, wherein the instructions, when executed, enable the data processing system to perform further operations comprising:
   after setting the protected cache to writeable mode, saving a new digest in the protected cache; and
   after saving the new digest in the cache, automatically setting the protected cache to read-only mode.

6. At least one non-transitory machine accessible medium according to claim 5, wherein the instructions, when executed, enable the data processing system to perform further operations comprising:
   saving a new boot object in the data processing system; and
   wherein the new digest comprises a cryptographic hash value for the new boot object.

7. At least one non-transitory machine accessible medium according to claim 5, wherein the operations of determining whether the user has been authorized to update the protected cache, setting the protected cache to writeable mode, saving the new digest in the protected cache, and automatically setting the protected cache to read-only mode are performed during the boot process.

8. At least one non-transitory machine accessible medium according to claim 5, wherein the instructions, when executed, enable the data processing system to perform further operations comprising:
   automatically monitoring whether the user is present at the data processing system after setting the protected cache to writeable mode; and
   automatically revoking write privileges in response to detecting absence of the user.

9. A method for booting a data processing system, the method comprising:
   in response to a data processing system being reactivated, performing a boot process for the data processing system, wherein the operation of performing the boot process comprises executing a boot object, and wherein the data processing system comprises a high integrity storage (HIS) device with a cache that is protected from updates;
   hashing the boot object to generate a digest of the boot object;
   saving the digest of the boot object in the protected cache of the HIS device;
   during the boot process, before executing the boot object, retrieving the digest for the boot object from the protected cache of the HIS device, wherein the digest comprises a cryptographic hash value for the boot object; and
   during the boot process, before retrieving the cached digest for the boot object from the protected cache of the HIS device, automatically setting the protected cache of the HIS device to read-only mode.

10. At least one non-transitory machine accessible medium comprising:
instructions which, when executed by a data processing system, enable the data processing system to perform the method recited in claim 9.

11. At least one non-transitory machine accessible medium according to claim 9, wherein the instructions, when executed, enable the data processing system to perform further operations comprising:
determining whether a user of the data processing system has been authorized to update the protected cache; and
setting the protected cache of the HIS device to writeable mode only after determining that the user has been authorized to update the protected cache.

12. A method for booting a data processing system, the method comprising:
in response to a data processing system being reactivated, performing a boot process for the data processing system, wherein the operation of performing the boot process comprises executing a boot object, and wherein the data processing system comprises a high integrity storage (HIS) device with a cache that is protected from updates;
during the boot process, before executing the boot object, retrieving a digest for the boot object from the protected cache of the HIS device, wherein the digest comprises a cryptographic hash value for the boot object; and
during the boot process, recording boot configuration data in an event log for a trusted platform module (TPM) in the processing system, wherein the boot configuration data indicates whether the HIS device was used during the boot process.

13. At least one non-transitory machine accessible medium comprising:
instructions which, when executed by a data processing system, enable the data processing system to perform the method recited in claim 12.

14. At least one non-transitory machine accessible medium according to claim 13, wherein the HIS device is integrated with the TPM.

15. At least one non-transitory machine accessible medium according to claim 14, wherein:
the operation of retrieving the digest for the boot object from the protected cache of the HIS device comprises executing a single instruction that causes the TPM to read the digest from the integrated HIS device and to extend the digest to a platform configuration register (PCR) in the TPM.

16. At least one non-transitory machine accessible medium according to claim 15, wherein the single instruction comprises a read-extend instruction.

17. At least one non-transitory machine accessible medium according to claim 13, wherein the digest for the boot object is obtained during the boot process without computing the digest for the boot object during that boot process.

18. At least one non-transitory machine accessible medium according to claim 13, wherein the instructions, when executed, enable the data processing system to perform further operations comprising:
during the boot process, using the retrieved digest for the boot object to extend a platform configuration register (PCR) in the TPM.

19. At least one non-transitory machine accessible medium according to claim 13, wherein the instructions, when executed, enable the data processing system to perform further operations comprising:
hashing the boot object to generate the digest of the boot object; and
saving the digest of the boot object in the protected cache of the HIS device.

20. At least one non-transitory machine accessible medium according to claim 13, wherein the instructions, when executed, enable the data processing system to perform further operations comprising:
during the boot process, before retrieving the cached digest for the boot object from the protected cache of the HIS device, automatically setting the protected cache of the HIS device to read-only mode.

21. At least one non-transitory machine accessible medium according to claim 13, wherein the instructions, when executed, enable the data processing system to perform further operations comprising:
determining whether a user of the data processing system has been authorized to update the protected cache; and
setting the protected cache of the HIS device to writeable mode only after determining that the user has been authorized to update the protected cache.

22. A method for booting a data processing system, the method comprising:
in response to a data processing system being reactivated, performing a boot process for the data processing system, wherein the operation of performing the boot process comprises executing a boot object, and wherein the data processing system comprises a trusted platform module (TPM) comprising an integrated high integrity storage (HIS) device with a cache that is protected from updates; and
during the boot process, before executing the boot object, retrieving a digest for the boot object from the protected cache of the HIS device, wherein the digest comprises a cryptographic hash value for the boot object.

23. At least one non-transitory machine accessible medium comprising:
instructions which, when executed by a data processing system, enable the data processing system to perform the method recited in claim 22.

24. At least one non-transitory machine accessible medium according to claim 23, wherein:
the operation of retrieving the digest for the boot object from the protected cache of the HIS device comprises executing a single instruction that causes the TPM to read the digest from the integrated HIS device and to extend the digest to a platform configuration register (PCR) in the TPM.

* * * * *

UNITED STATES PATENT AND TRADEMARK OFFICE
CERTIFICATE OF CORRECTION

PATENT NO. : 8,892,858 B2 Page 1 of 1
APPLICATION NO. : 13/810654
DATED : November 18, 2014
INVENTOR(S) : Ned M. Smith et al.

It is certified that error appears in the above-identified patent and that said Letters Patent is hereby corrected as shown below:

On the Title Page, column 2, Item (56), under "Other Publications", line 37, delete "2011800494171" and insert -- 201180049417.1 --, therefor.

In the Claims

In column 15, line 9, in claim 11, delete "claim 9," and insert -- claim 10, --, therefor.

Signed and Sealed this
Eighth Day of September, 2015

Michelle K. Lee
*Director of the United States Patent and Trademark Office*